United States Patent
Leon

(10) Patent No.: US 11,336,640 B2
(45) Date of Patent: May 17, 2022

(54) PRE-AUTHORIZATION FOR SERVICE-TO-SERVICE REQUESTS

(71) Applicant: CITRIX SYSTEMS, INC., Fort Lauderdale, FL (US)

(72) Inventor: Felipe Leon, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 502 days.

(21) Appl. No.: 16/292,786

(22) Filed: Mar. 5, 2019

(65) Prior Publication Data

US 2020/0287894 A1    Sep. 10, 2020

(51) Int. Cl.
*H04L 9/40* (2022.01)
*H04L 9/32* (2006.01)
*H04L 29/06* (2006.01)

(52) U.S. Cl.
CPC ........ *H04L 63/0853* (2013.01); *H04L 9/3213* (2013.01); *H04L 9/3247* (2013.01); *H04L 63/10* (2013.01)

(58) Field of Classification Search
CPC . H04L 63/0853; H04L 9/3213; H04L 9/3247; H04L 63/10; H04L 63/0807; G06F 21/335
See application file for complete search history.

(56) References Cited

U.S. PATENT DOCUMENTS

| | | | |
|---|---|---|---|
| 9,538,345 B2 | 1/2017 | Sah et al. | |
| 10,630,682 B1* | 4/2020 | Bhattacharyya | H04L 9/0841 |
| 10,666,657 B1* | 5/2020 | Threlkeld | H04L 63/20 |
| 2005/0132060 A1 | 6/2005 | Mo et al. | |
| 2016/0226879 A1* | 8/2016 | Chan | H04L 63/0815 |
| 2018/0367306 A1* | 12/2018 | Bahety | H04L 63/0807 |
| 2019/0014088 A1 | 1/2019 | Subramaniyan et al. | |
| 2020/0119586 A1* | 4/2020 | Russo | G06F 21/35 |
| 2020/0267552 A1* | 8/2020 | Lee | H04W 12/55 |

OTHER PUBLICATIONS

International Search Report and Written Opinion dated May 11, 2020 for PCT/US2020/019576 filed Feb. 25, 2020; pp. 11.
Gemalto, et al.; "TR-0019 Improvements"; SEC WI-0019, oneM2M-TR-0019; SEC-2015-0654-TR-00019_Improvements; Copyright 2015 oneM2M Partners; pp. 6.

* cited by examiner

*Primary Examiner* — Michael R Vaughan
(74) *Attorney, Agent, or Firm* — Hoffman Warnick LLC

(57) ABSTRACT

Methods and systems for authorizing a service request between two services in a network environment are disclosed. One method includes, in a recurring background process occurring separate from a service request, having a target service obtain a pre-authorization token including a signature of the request service. In response to confirming the pre-authorization token was issued by the request service, the pre-authorization token is acknowledged and stored for access by instance(s) of the target service. The acknowledged pre-authorization token is saved for use with service requests to the target service from the request service. In response to receiving a service request including pre-authorization token at an instance of the target service, the method confirms the pre-authorization token matches a stored, acknowledged pre-authorization token, and, if so confirmed, authorizes the service request. Pre-authorization tokens have a set duration. The methods and systems reduce computational overhead of the authorization, resulting in decreased latency.

24 Claims, 10 Drawing Sheets

PRE-AUTHORIZATION FOR SERVICE-TO-SERVICE REQUESTS

BACKGROUND OF THE DISCLOSURE

Personal computers include combinations of operating systems, applications, and user settings, which are each managed individually by owners or administrators on an ongoing basis. However, many organizations are now using application virtualization and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). A "virtualized desktop" and/or "virtual applications" may be stored in and administered by a remote server, rather than in the local storage of the client computing device.

Web applications are another approach to remotely provisioning and providing applications. One example web application approach for software licensing and delivery is Software as a Service (SaaS). SaaS is an approach to software delivery by which software applications are centrally hosted on the Internet and provided on a subscription basis to users. SaaS applications are typically accessed on client devices with a thin client via a browser program, and may in some instances be provided through a virtual computing session. Services that deliver applications in this setting may place service requests to other services.

BRIEF DESCRIPTION OF THE DISCLOSURE

A first aspect of the disclosure provides a method for authorizing a service request between two services in a network environment. The method includes, in a recurring background process occurring separate from a service request between a first service and a second service: obtaining a pre-authorization token including a signature of the first service. In response to confirming the pre-authorization token was issued by the first service specified in the signature, the method acknowledges the pre-authorization token, and stores the acknowledged pre-authorization token for access by any instance of the second service. In response to receiving a service request including the pre-authorization token at an instance of the second service, the method confirms the pre-authorization token matches a stored, acknowledged pre-authorization token, and, in response to the confirmation, authorizes the service request.

A second aspect of the disclosure provides a system for authorizing a service request between two services in a network environment. The system may include a target service configured to run a recurring background process occurring separate from a service request between a request service and the target service. The recurring background process includes: obtaining a pre-authorization token including a signature of the first service. In response to confirming the pre-authorization token was issued by the first service specified in the signature, the method acknowledges the pre-authorization token, and stores the acknowledged pre-authorization token for access by any instance of the second service. The target service is further configured to: in response to receiving a service request including the pre-authorization token at an instance of the second service, confirming the pre-authorization token matches a stored, acknowledged pre-authorization token, and, in response to the confirmation, authorizing the service request.

A third aspect of the disclosure provides a method for authorizing a service request between two services in a network environment. The method may include, in a recurring background process occurring separate from a service request between a first service and a second service: generating a pre-authorization token including a signature of the first service, publishing the pre-authorization token for access by any instance of the second service, obtaining an acknowledgment acknowledging validation of the pre-authorization token as being issued by the first service specified in the signature in the pre-authorization token, and storing the acknowledged pre-authorization token for access by the first service. The method may also include transmitting a service request including the acknowledged pre-authorization token to the second service; and receiving an authorization for the service request.

A fourth aspect of the disclosure includes a system for authorizing a service request between two services in a network environment. The system includes a request service configured to perform a recurring background process occurring separate from a service request between the request service and a target service. The recurring background process includes: generating a pre-authorization token including a signature of the request service, publishing the pre-authorization token for access by any instance of the target service, obtaining an acknowledgment acknowledging validation of the pre-authorization token as being issued by the request service specified in the signature in the pre-authorization token, and storing the acknowledged pre-authorization token for access by the request service. The request service is further configured to: transmit a service request including the acknowledged pre-authorization token to the target service; and receive an authorization for the service request.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide methods and systems for pre-authorization of a service request between two services with a number of advantages relative to conventional processes. One method includes, in a recurring background process occurring separate from a service request, having a target service obtain a pre-authorization token including a signature of the request service. In response to confirming the pre-authorization token was issued by the request service, the pre-authorization token is acknowledged and stored for access by instance(s) of the target service. The acknowledged pre-authorization token is saved for use with service requests to the target service from the request service. In response to receiving a service request including pre-authorization token at an instance of the target service, the method confirms the pre-authorization token matches a stored, acknowledged pre-authorization token, and, if so confirmed, authorizes the service request. Pre-authorization tokens have a set duration. The teachings of the disclosure do not require changes in infrastructure, such as maintaining client certificates for service instances, and do not remove any existing authentication mechanisms for platform services. However, embodiments of the disclosure can drastically improve overall performance for customer facing tasks by reducing computational overhead and latency caused by existing authentication mechanisms.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for SSL handshake processing; and Section E describes embodiments of systems and methods for pre-authorizing a service-to-service request.

A. Network and Computing Environment

Figure 1A:
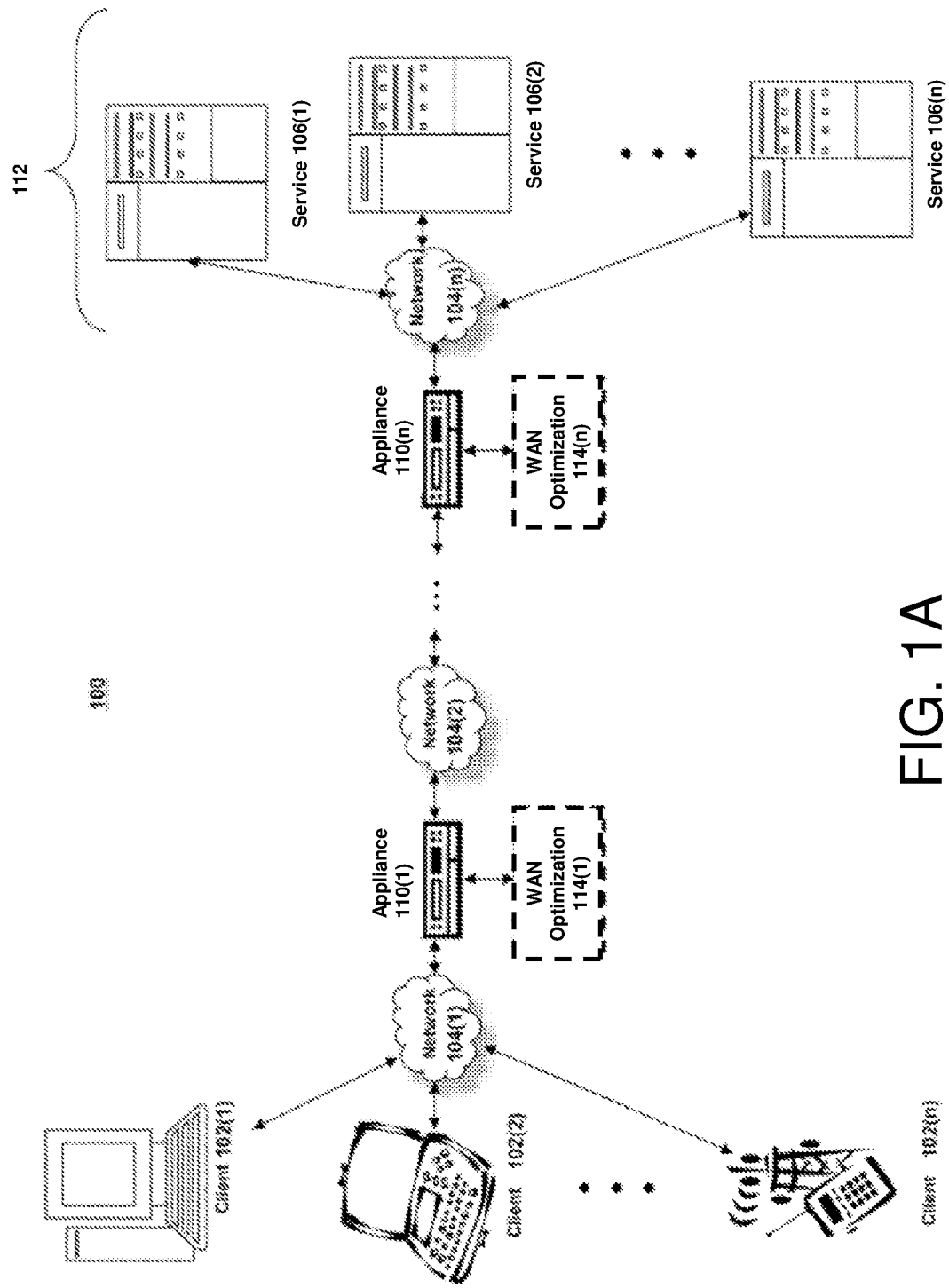
FIG. 1A is a block diagram of a network environment, in accordance with an illustrative embodiment.

Referring to FIG. 1A, an illustrative network environment 100 is depicted. Network environment 100 may be implemented as a cloud computing environment, an on-premises ("on-prem") computing environment, or a hybrid computing environment. Cloud computing environments typically employ a network of remote, hosted servers to manage, store and/or process data, instead of personal computers or local servers as in an on-prem computing environment. A cloud computing environment includes a network of interconnected nodes, and provides a number of services, for example by hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-prem computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-prem computing environments in a hybrid configuration.

Network environment 100 may include one or more clients 102(1)-102(n) (also generally referred to as local machine(s) 102 or client(s) 102) in communication with one or more services 106(1)-106(n) (also generally referred to as remote service machine(s) 106, servers 106 or service server(s) 106) via one or more networks 104(1)-104n (generally referred to as network(s) 104). In some embodiments, a client 102 may communicate with a service 106 via one or more appliances 110(1)-110n (generally referred to as appliance(s) 110 or gateway(s) 110).

Although the embodiment shown in FIG. 1A shows one or more networks 104 between clients 102 and services 106, in other embodiments, clients 102 and services 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 110 may be located at various points or in various communication paths of network environment 100. For example, appliance 110 may be deployed between two networks 104(1) and 104(2), and appliances 110 may communicate with one another to work in conjunction to, for example, accelerate network traffic between clients 102 and services 106. In other embodiments, appliance 110 may be located on a network 104. For example, appliance 110 may be implemented as part of one of clients 102 and/or services 106. In an embodiment, appliance 110 may be implemented as a network device such as Citrix Networking products including, for example, Citric ADC and Citrix Gateway, sold by Citrix Systems, Inc. of Fort Lauderdale, Fla.

As shown in FIG. 1A, one or more services 106 may operate as a server farm 112. Services 106 of server farm 112 may be logically grouped, and may either be geographically co-located (e.g., on premises) or geographically dispersed (e.g., cloud based) from clients 102 and/or other services 106. In an embodiment, server farm 112 executes one or more services such as applications on behalf of one or more of clients 102 (e.g., as an application server), although other uses are possible, such as a file server, gateway server, proxy server, or other similar server uses. Clients 102 may seek access to hosted applications on services 106.

As shown in FIG. 1A, in some embodiments, appliances 110 may include, be replaced by, or be in communication with, one or more additional appliances, such as WAN optimization appliances 114(1)-114(n), referred to generally as WAN optimization appliance(s) 114. For example, WAN optimization appliance 114 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 114 may be a performance enhancing proxy or a WAN optimization controller. In one embodiment, appliance 114 may be implemented as products sold by Citrix Systems, Inc. of Fort Lauderdale, Fla., such as Citrix SD-WAN or Citric Cloud.

Figure 1B:
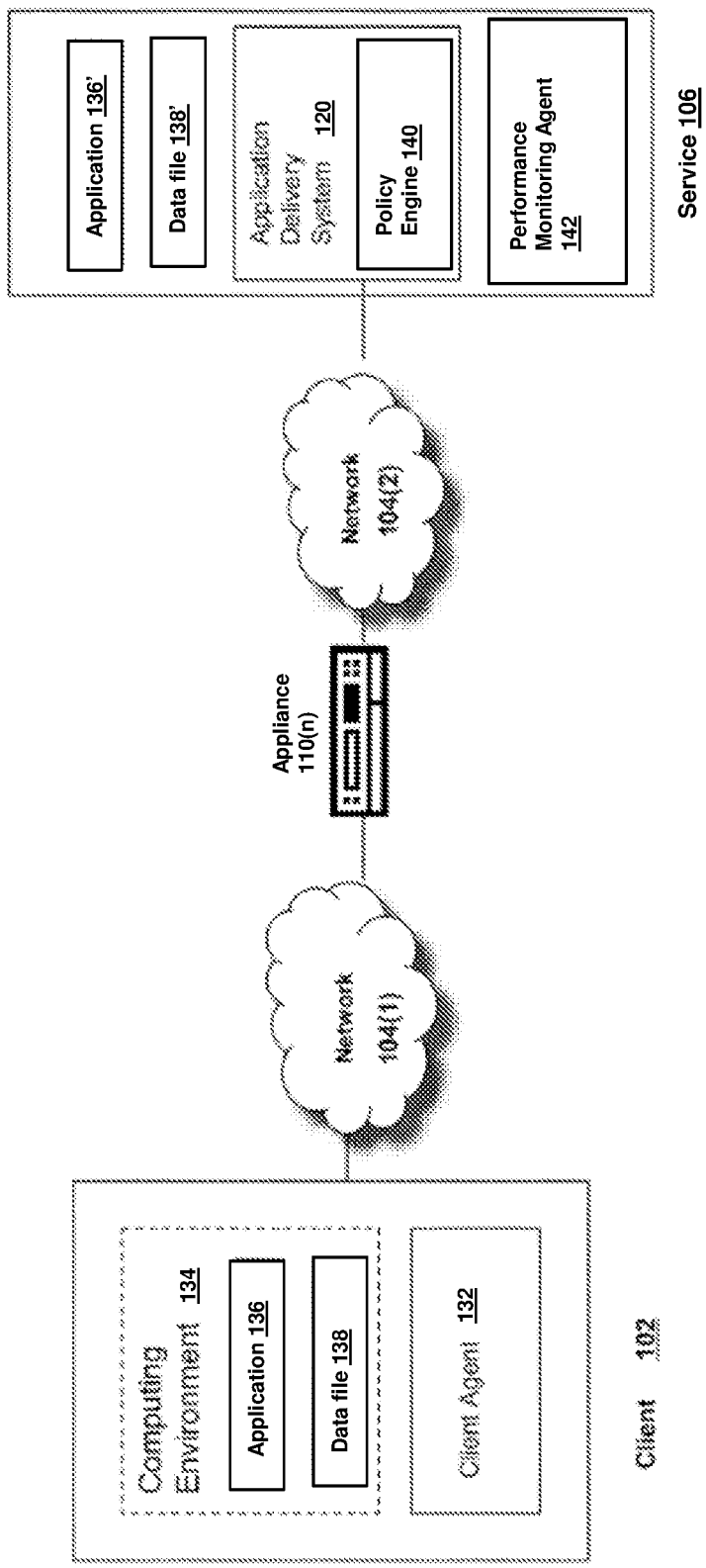
FIG. 1B is a block diagram of a network environment for delivering a computing environment from a server to a client via an appliance, in accordance with an illustrative embodiment.

Referring to FIG. 1B, an example network environment for delivering and/or operating a computing network environment on a client 102 is shown. As shown in FIG. 1B, a service 106 may include an application delivery system 120 for delivering a computing environment, application, and/or data files to one or more clients 102. As will be described relative to FIG. 5, service 106 may access additional services 130, e.g., service servers that provide specific functions that support delivering the computing network environment, for example, a computing environment, application, and/or data files to one or more clients 102. Client 102 may include a client agent 132 and a computing environment 134. Computing environment 134 may execute or operate an application 136 that accesses, processes or uses a data file 138. Computing environment 134, application 136 and/or data file 138 may be delivered via appliance 110 and/or service 106.

Appliance 110 may accelerate delivery of all or a portion of computing environment 134 to a client 102, for example by application delivery system 120. For example, appliance 110 may accelerate delivery of a streaming application 136' and data file 138' processable by the application from a data center to a remote user location by accelerating transport layer traffic between a client 102 and a service 106. Such acceleration may be provided by one or more techniques, such as: 1) transport layer connection pooling, 2) transport layer connection multiplexing, 3) transport control protocol buffering, 4) compression, 5) caching, or other techniques. Appliance 110 may also provide load balancing of services 106 to process requests from clients 102, act as a proxy or access server to provide access to the one or more services 106, provide security and/or act as a firewall between a client 102 and a service 106, provide Domain Name Service (DNS) resolution, provide one or more virtual servers or virtual internet protocol servers, and/or provide a secure virtual private network (VPN) connection from a client 102 to a service 106, such as a secure socket layer (SSL) VPN connection and/or provide encryption and decryption operations.

Application delivery system 120 may deliver computing environment 134 to a user (e.g., client 102), remote or otherwise, based on authentication and authorization policies applied by policy engine 140. A remote user may obtain a computing environment and access to server stored applications and data files from any network-connected device (e.g., client 102). For example, appliance 110 may request an application 136' and data file 138' from service 106. In response to the request, application delivery system 120 and/or service 106 may deliver the application and data file to client 102, for example via an application stream to operate in computing environment 134 on client 102, or via a remote-display protocol or otherwise via remote-based or server-based computing. In an embodiment, application delivery system 120 may be implemented as any portion of the Citrix Workspace Suite™ by Citrix Systems, Inc., such as Citrix Virtual Apps and Desktops.

Policy engine 140 may control and manage the access to, and execution and delivery of, applications. For example, policy engine 140 may determine the one or more applications a user or client 102 may access and/or how the application should be delivered to the user or client 102, such as a server-based computing, streaming or delivering the application locally to client 102 for local execution. For example, in operation, a client 102 may request execution of an application (e.g., application 136') and application delivery system 120 of service 106 determines how to execute application 136', for example based upon credentials received from client 102 and a user policy applied by policy engine 140 associated with the credentials. For example, application delivery system 120 may enable client 102 to receive application-output data generated by execution of the application on a service 106, may enable client 102 to execute the application locally after receiving the application from service 106, may stream the application via network 104 to client 102, or may access another service 130 (FIG. 5) to execute at least part of the application functions. For example, in some embodiments, the application may be a server-based or a remote-based application executed on service 106 and/or service 130 (FIG. 5) on behalf of client 102. Service 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of services 106 may include a performance monitoring service or agent 142. In some embodiments, a dedicated one or more services 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 132), services 106 (e.g., agent 142) or an appliances 110 and/or 114 (agent not shown). In general, performance monitoring agents 142 execute transparently (e.g., in the background) to any application and/or user of the device. In some embodiments, performance monitoring agent 142 includes any of the product embodiments referred to as Citrix Analytics by Citrix Systems, Inc. of Fort Lauderdale, Fla.

Figure 5:
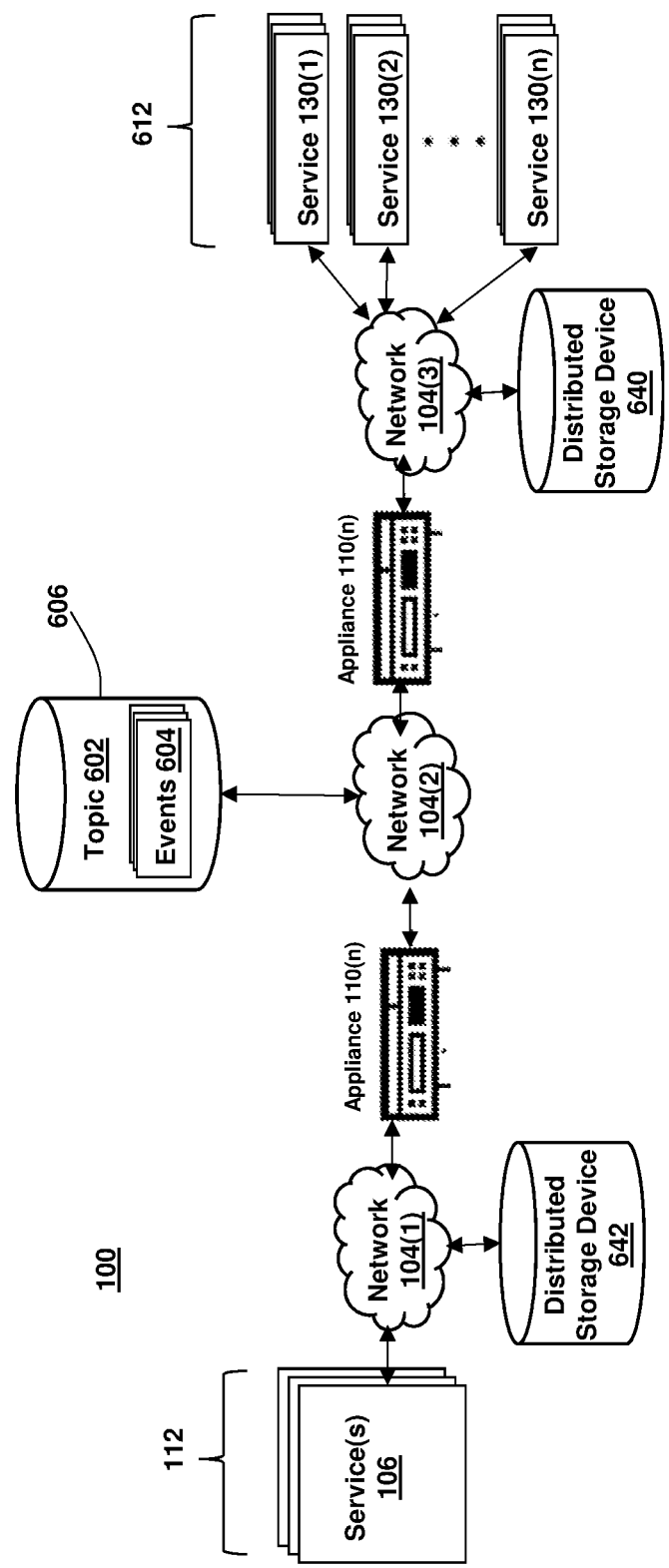
FIG. 5 is a block diagram of additional details of a network environment, in accordance with an illustrative embodiment.

The performance monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 110 and/or 114, and/or services 106 and/or 130 (FIG. 5). For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 120. For example, based upon one or more monitored performance conditions or metrics, application delivery system 120 may be dynamically adjusted, for example periodically or in real-time, to optimize application delivery by services 106 to clients 102 based upon network environment performance and conditions. In another example, based upon one or more monitored performance conditions or metrics, application delivery system 120 may be dynamically adjusted, for example periodically or in real-time, to implement a pre-authorization protocol in accordance with embodiments of the disclosure between services 106 and services 130 (FIG. 5), the latter of which may function to, for example, provide specific functions necessary for application delivery.

In described embodiments, clients 102, services 106 and/or services 130 (FIG. 5), and appliances 110 and 114 may be deployed as and/or executed on any type and form of computing device, such as any desktop computer, laptop computer, or mobile device capable of communication over at least one network and performing the operations described herein. For example, clients 102, services 106 and services 130 (FIG. 5) and/or appliances 110 and 114 may each correspond to one computer, a plurality of computers, or a network of distributed computers such as computer 150 shown in FIG. 1C.

Figure 1C:
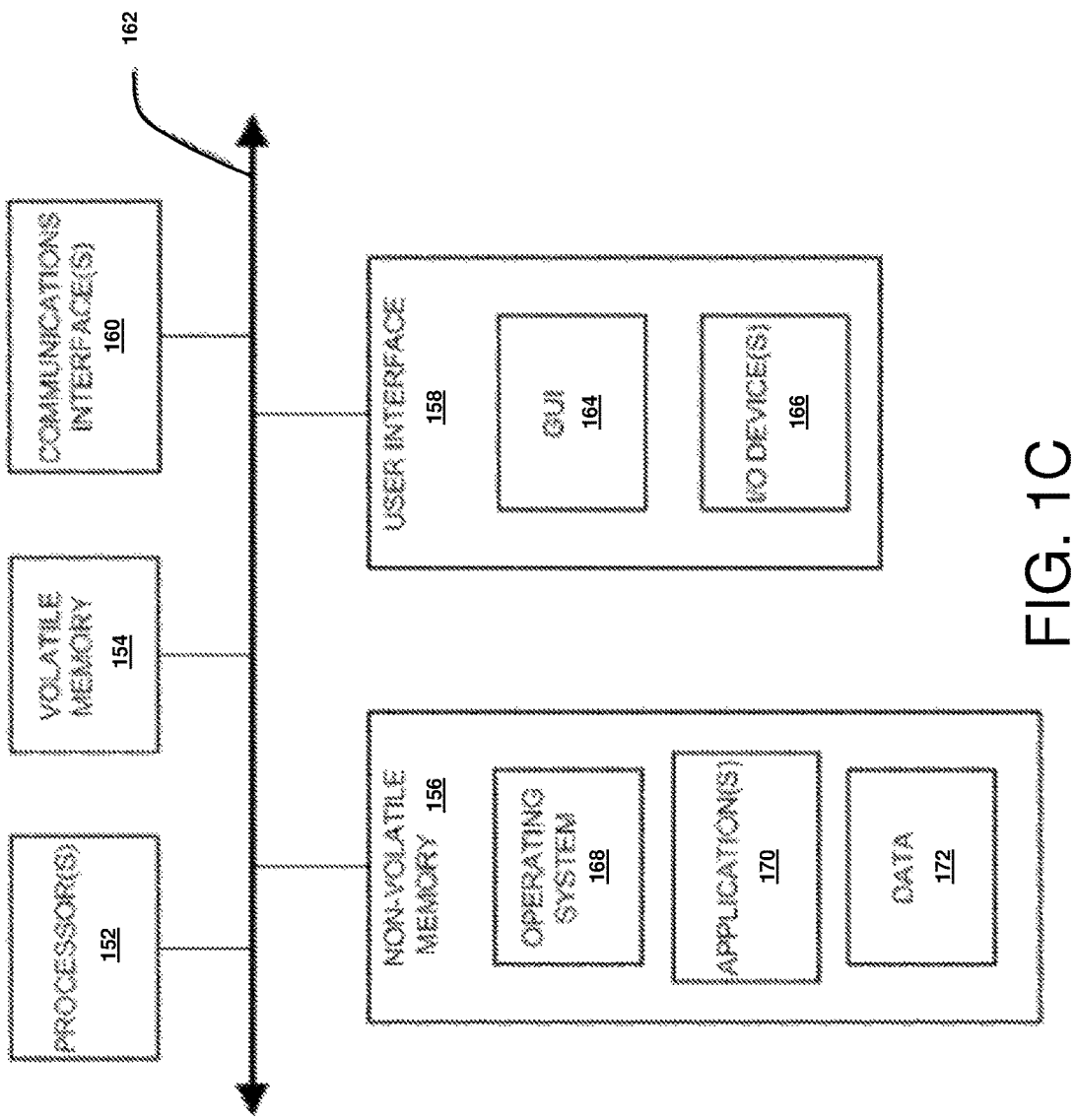
FIG. 1C is a block diagram of a computing device, in accordance with an illustrative embodiment.

As shown in FIG. 1C, computer 150 may include one or more processors 152; volatile memory 154 (e.g., RAM); non-volatile memory 156 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof); user interface (UI) 158; one or more communications interfaces 160; and communication bus 162. UI 158 may include graphical user interface (GUI) 164 (e.g., a touchscreen, a display, etc.) and one or more input/output (I/O) devices 166 (e.g., a mouse, a keyboard, etc.). Non-volatile memory 156 stores operating system 168, one or more applications 170, and data 172 such that, for example, computer instructions of operating system 168 and/or applications 170 are executed by processor(s) 152 out of volatile memory 154. Data may be entered using an input device of GUI 164 or received from I/O device(s) 166. Various elements of computer 150 may communicate via communication bus 162. Computer 150 in FIG. 1C is shown merely as an example, as clients 102, services 106 and 130 and/or appliances 110 and 114 may be implemented by any computing or processing environment and with any type of machine or set of machines that may have suitable hardware and/or software capable of operating as described herein.

Processor(s) 152 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 160 may include one or more interfaces to enable computer 150 to access a computer network such as a LAN, a WAN, or the Internet through a variety of wired and/or wireless or cellular connections.

In described embodiments, a computer 150, for example: may execute an application on behalf of a user of a client computing device (e.g., a client 102); may execute a virtual machine, which provides an execution session within which applications execute on behalf of a user or a client computing device (e.g., a client 102), such as a hosted desktop session; may execute a terminal services session to provide a hosted desktop environment; may provide access to a computing environment including one or more of: one or more applications, one or more desktop applications, and one or more desktop sessions in which one or more applications may execute; and/or may execute a pre-authorization protocol for server to server access, as described herein.

B. Appliance Architecture

Figure 2:
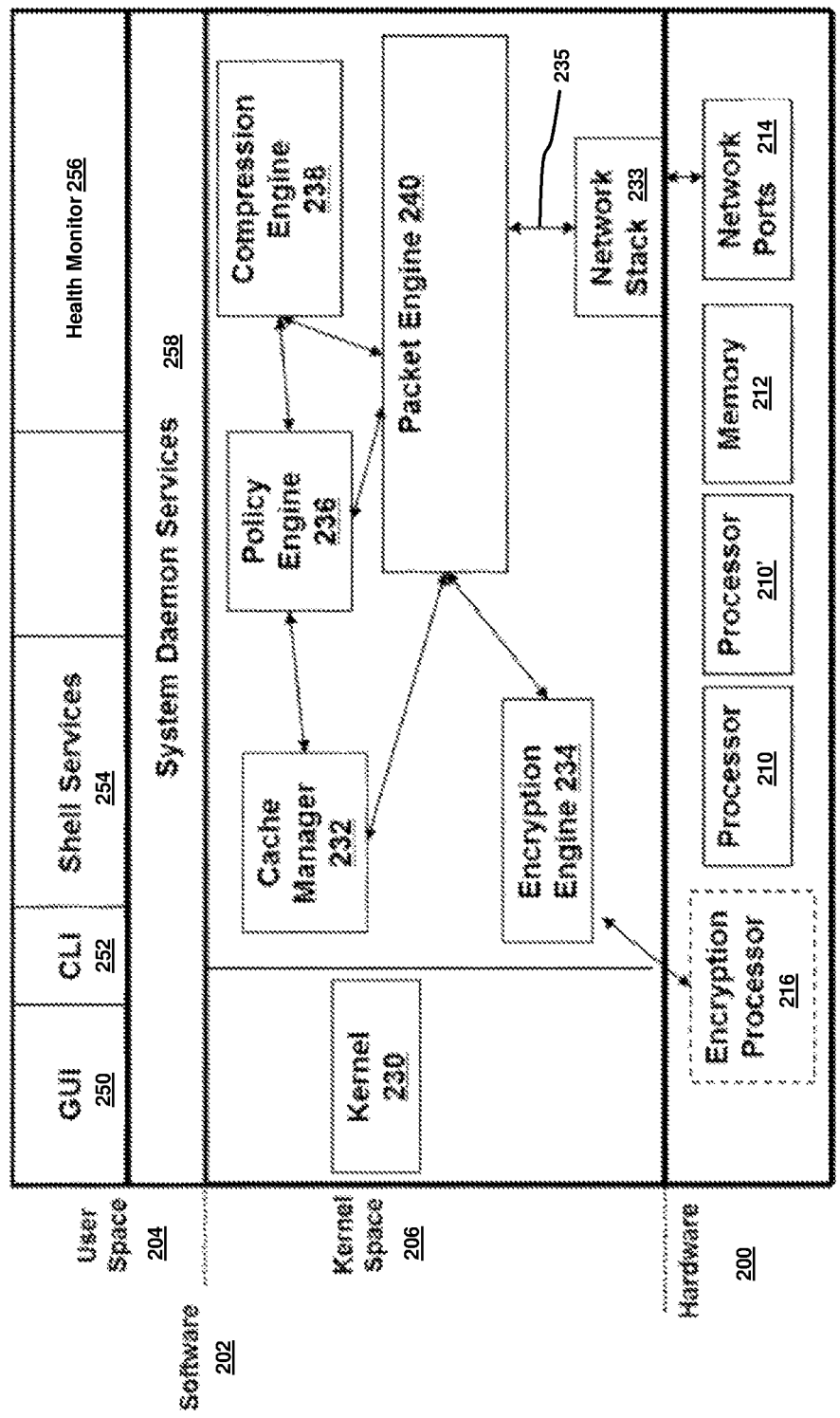
FIG. 2 is a block diagram of an appliance for processing communications between a client and a server, in accordance with an illustrative embodiment.

FIG. 2 shows an example embodiment of an appliance 110. As described herein, appliance 110 may be implemented as a server, gateway, router, switch, bridge or other type of computing or network device. As shown in FIG. 2, an embodiment of appliance 110 may include a hardware layer 200 and a software layer 202, the latter divided into a user space 204 and a kernel space 206. Hardware layer 200 provides the hardware elements upon which programs and services within kernel space 206 and user space 204 are executed and allow programs and services within kernel space 206 and user space 204 to communicate data both internally and externally with respect to appliance 110. As shown in FIG. 2, hardware layer 200 may include one or more processors 210, 210' for executing software programs and services, memory 212 for storing software and data, network ports 214 for transmitting and receiving data over a network, and an encryption processor 216 for encrypting and decrypting data such as in relation to Secure Socket Layer (SSL) or Transport Layer Security (TLS) processing of data transmitted and received over the network.

An operating system of appliance 110 allocates, manages, or otherwise segregates the available system memory into user space 204 and kernel space 206. Kernel space 206 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 206 may also include a number of network services or processes working in conjunction with cache manager 232. Appliance 110 may include one or more network stacks 233, such as a TCP/IP based stack, for communicating with client(s) 102, service(s) 106, network(s) 104, and/or other appliances 110 or 114. For example, appliance 110 may establish and/or terminate one or more transport layer connections between clients 102 and services 106, or between services 106 and 130. Each network stack 233 may include a buffer 235 for queuing one or more network packets for transmission by appliance 110.

Kernel space 206 may include a cache manager 232, an encryption engine 234, a policy engine 236, a compression engine 238 and a packet engine 240. In other words, one or more of processes (e.g., cache manager 232, encryption engine 234, policy engine 236, compression engine 238 and/or packet engine 240) run in the core address space of the operating system of appliance 110, which may reduce the number of data transactions to and from the memory and/or context switches between kernel mode and user mode, for example since data obtained in kernel mode may not need to be passed or copied to a user process, thread or user level data structure. Cache manager 232 may duplicate original data stored elsewhere or data previously computed, generated or transmitted to reducing the access time of the data. In some embodiments, the cache memory may be a data object in memory 212 of appliance 110, or may be a physical memory having a faster access time than memory 212.

Policy engine 236 may include a statistical engine or other configuration mechanism to allow a user to identify, specify, define or configure a caching policy and access, control and management of objects, data or content being cached by appliance 110, and define or configure security, network traffic, network access, compression or other functions performed by appliance 110.

Encryption engine 234 may process any security related protocol, such as SSL or TLS. For example, encryption engine 234 may encrypt and decrypt network packets, or any portion thereof, communicated via appliance 110, may setup or establish SSL, TLS or other secure connections, for example between client 102, service(s) 106, and/or other appliance(s) 110 or 114. In some embodiments, encryption engine 234 may use a tunneling protocol to provide a VPN between a client 102 and a service 106. In some embodiments, encryption engine 234 is in communication with encryption processor 216. Compression engine 238 compresses network packets bi-directionally between clients 102 and services 106 and/or between one or more appliances 110.

Packet engine 240 may manage kernel-level processing of packets received and transmitted by appliance 110 via network stacks 234 to send and receive network packets via network ports 214. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 204 is a memory area or portion of the operating system used by user mode applications or programs otherwise running in user mode. A user mode application may not access kernel space 206 directly and uses service calls in order to access kernel services. User space 204 may include graphical user interface (GUI) 250, a command line interface (CLI) 252, shell services 254, health monitor 256, and system daemon services 258. GUI 250 and CLI 252 enable a system administrator or other user to interact with and control the operation of appliance 110, such as via the operating system of appliance 110. Shell services 254 include the programs, services, tasks, processes or executable instructions to support interaction with appliance 110 by a user via the GUI 250 and/or CLI 252.

Health monitor 256 monitors, checks, reports and ensures that network systems are functioning properly and that users are receiving requested content over a network, for example by monitoring activity of appliance 110. In some embodiments, health monitor 256 intercepts and inspects any network traffic passed via appliance 110. For example, health monitor 256 may interface with one or more of encryption engine 234, cache manager 232, policy engine 236, compression engine 238, packet engine 240, system daemon services 258, and shell services 254 to determine a state, status, operating condition, or health of any portion of the appliance 110. Further, health monitor 256 may determine if a program, process, service or task is active and currently running, check status, error or history logs provided by any program, process, service or task to determine any condition, status or error with any portion of appliance 110. Additionally, health monitor 256 may measure and monitor the performance of any application, program, process, service, task or thread executing on appliance 110.

System daemon services 258 are programs that run continuously or in the background and handle periodic service requests received by appliance 110. In some embodiments, system daemon service 258 may forward the requests to other programs or processes, such as another daemon service 258, as appropriate.

As described herein, appliance 110 may relieve services 106 of much of the processing load caused by repeatedly opening and closing transport layers connections to clients 102 by opening one or more transport layer connections with each service 106 and maintaining these connections to allow repeated data accesses by clients via the Internet (e.g., "connection pooling"). To perform connection pooling, appliance 110 may translate or multiplex communications by modifying sequence numbers and acknowledgment numbers at the transport layer protocol level (e.g., "connection multiplexing"). Appliance 110 may also provide switching or load balancing for communications between the client 102 and service 106.

As described herein, each client 102 may include a client agent 132 for establishing and exchanging communications with an appliance 110 and/or a service 106 via a network 104. Client 102 may have installed and/or execute one or more applications that are in communication with network 104. Client agent 132 may intercept network communications from a network stack used by the one or more applications. For example, client agent 132 may intercept a network communication at any point in a network stack and redirect the network communication to a destination desired, managed or controlled by client agent 132, for example to intercept and redirect a transport layer connection to an IP address and port controlled or managed by client agent 132. Thus, client agent 132 may transparently intercept any protocol layer below the transport layer, such as the network layer, and any protocol layer above the transport layer, such as the session, presentation or application layers. Client agent 132 can interface with the transport layer to secure, optimize, accelerate, route or load-balance any communications provided via any protocol carried by the transport layer.

In some embodiments, client agent 132 is implemented as an Independent Computing Architecture (ICA) client developed by Citrix Systems, Inc. Client agent 132 may perform acceleration, streaming, monitoring, and/or other operations. For example, client agent 132 may accelerate streaming an application from a service 106 to a client 102. Client agent 132 may also perform end-point detection/scanning and collect end-point information about client 102 for appliance 110 and/or service 106. Appliance 110 and/or service 106 may use the collected information to determine and provide access, authentication and authorization control of the client's connection to network 104. For example, client agent 132 may identify and determine one or more client-side attributes, such as: the operating system and/or a version of an operating system, a service pack of the operating system, a running service, a running process, a file, presence or versions of various applications of the client, such as anti-virus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 304, a hypervisor layer 306, and a hardware layer 308. Hypervisor layer 306 includes one or more hypervisors (or virtualization managers) 320 that allocates and manages access to a number of physical resources in hardware layer 308 (e.g., physical processor(s) 322 and physical disk(s) 324 by at least one virtual machine (VM) 330 (e.g., one of VMs 330) executing in virtualization layer 304. Each VM 330 may include allocated virtual resources such as virtual processors 332 and/or virtual disks 342, as well as virtual resources such as virtual memory and virtual network interfaces. In some embodiments, at least one of VMs 330 may include a control operating system (e.g., 340) in communication with hypervisor 320 and used to execute applications for managing and configuring other VMs (e.g., guest operating systems 340a) on device 302.

In general, hypervisor(s) 320 may provide virtual resources to an operating system of VMs 330 in any manner that simulates the operating system having access to a physical device. Thus, hypervisor(s) 320 may be used to emulate virtual hardware, partition physical hardware, virtualize physical hardware, and execute virtual machines that provide access to computing environments. In an illustrative embodiment, hypervisor(s) 320 may be implemented as a XEN hypervisor, for example as provided by the open source Xen.org community. In an illustrative embodiment, device 302 executing a hypervisor that creates a virtual machine platform on which guest operating systems may execute is referred to as a host server.

Hypervisor 320 may create one or more VMs 330 in which an operating system (e.g., control operating system 340 and/or guest operating system 340a) executes. For example, the hypervisor 320 loads a virtual machine image to create VMs 330 to execute an operating system. Hypervisor 320 may present VMs 330 with an abstraction of hardware layer 308, and/or may control how physical capabilities of hardware layer 308 are presented to VMs 330. For example, hypervisor(s) 320 may manage a pool of resources distributed across multiple physical computing devices.

In some embodiments, one of VMs 330 (e.g., the VM executing control operating system 340) may manage and configure other VMs 330, for example by managing the execution and/or termination of a VM and/or managing allocation of virtual resources to a VM. In various embodiments, VMs may communicate with hypervisor(s) 320 and/or other VMs via, for example, one or more Application Programming Interfaces (APIs), shared memory, and/or other techniques.

In general, VMs 330 may provide a user of device 302 with access to resources within virtualized computing environment 300, for example, one or more programs, applications, documents, files, desktop and/or computing environments, or other resources. In some embodiments, VMs 330 may be implemented as fully virtualized VMs that are not aware that they are virtual machines (e.g., a Hardware Virtual Machine or HVM). In other embodiments, the VM may be aware that it is a virtual machine, and/or the VM may be implemented as a para-virtualized (PV) VM.

Figure 3:
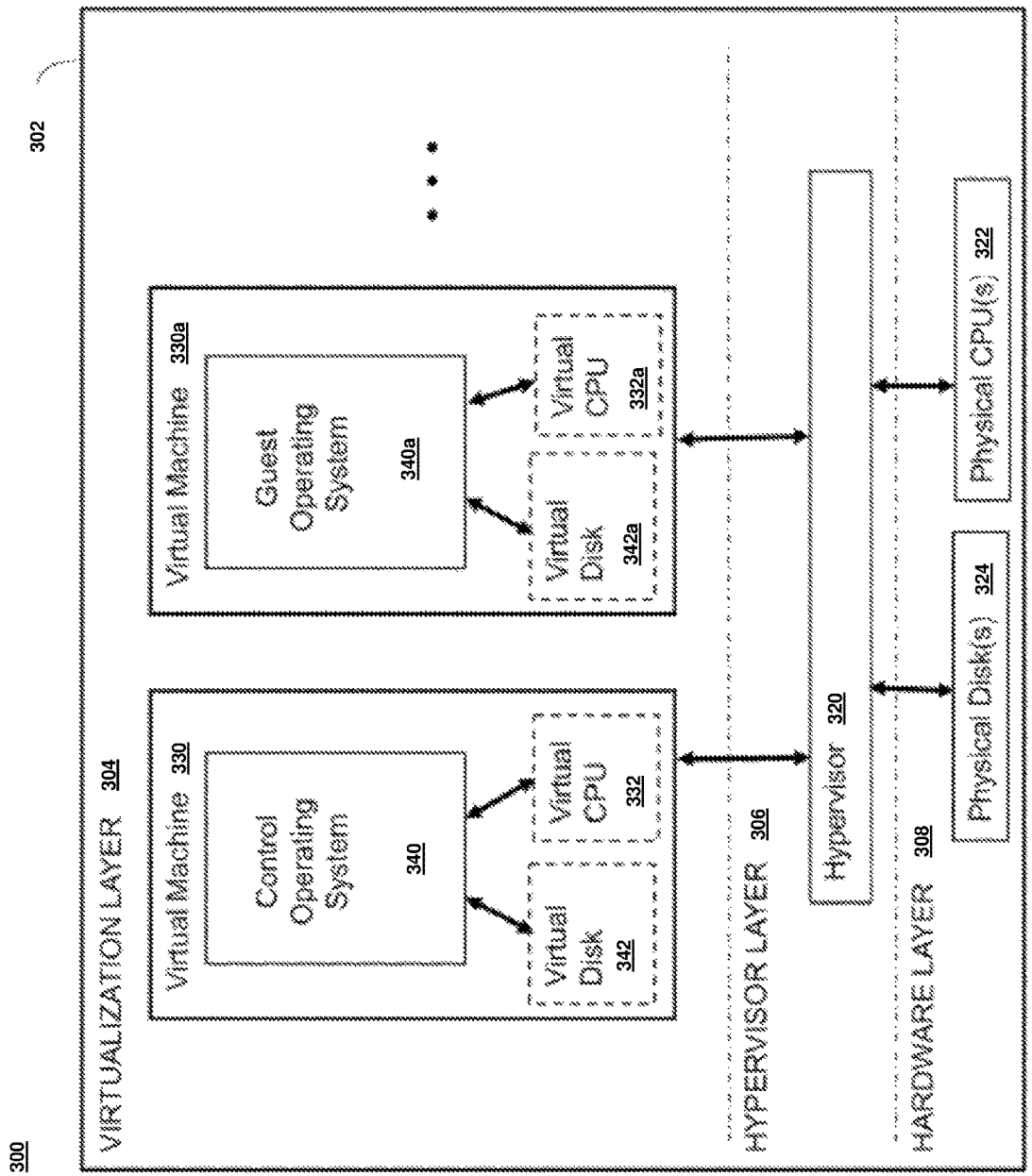
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 110 may be additionally or alternatively implemented in a virtualized environment 300 on any computing device, such as a client 102, service 106 (FIGS. 1A, 4), service 130 (FIG. 5) or appliance 110. Virtual appliances may provide functionality for availability, performance, health monitoring, caching and compression, connection multiplexing and pooling and/or security processing (e.g., firewall, VPN, encryption/decryption, etc.), similarly as described in regard to appliance 110.

In some embodiments, a server may execute multiple virtual machines 330, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.). Further, instead of (or in addition to) the functionality of the cores being implemented in the form of a physical processor/core, such functionality may be implemented in a virtualized environment (e.g., 300) on a client 102, service 106, service 130 (FIG. 5) or appliance 110, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor. For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet. The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of implementation and operations of network environment 100, clients 102, services 106, and appliance 110, 114 (section A); the implementation and operations of appliance 110 (section B); and the implementation and operation of a multi-processor and/or multicore system or the implementation and operation of virtualized computing environment 300 (section C), may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for SSL Handshake Processing

Figure 4:
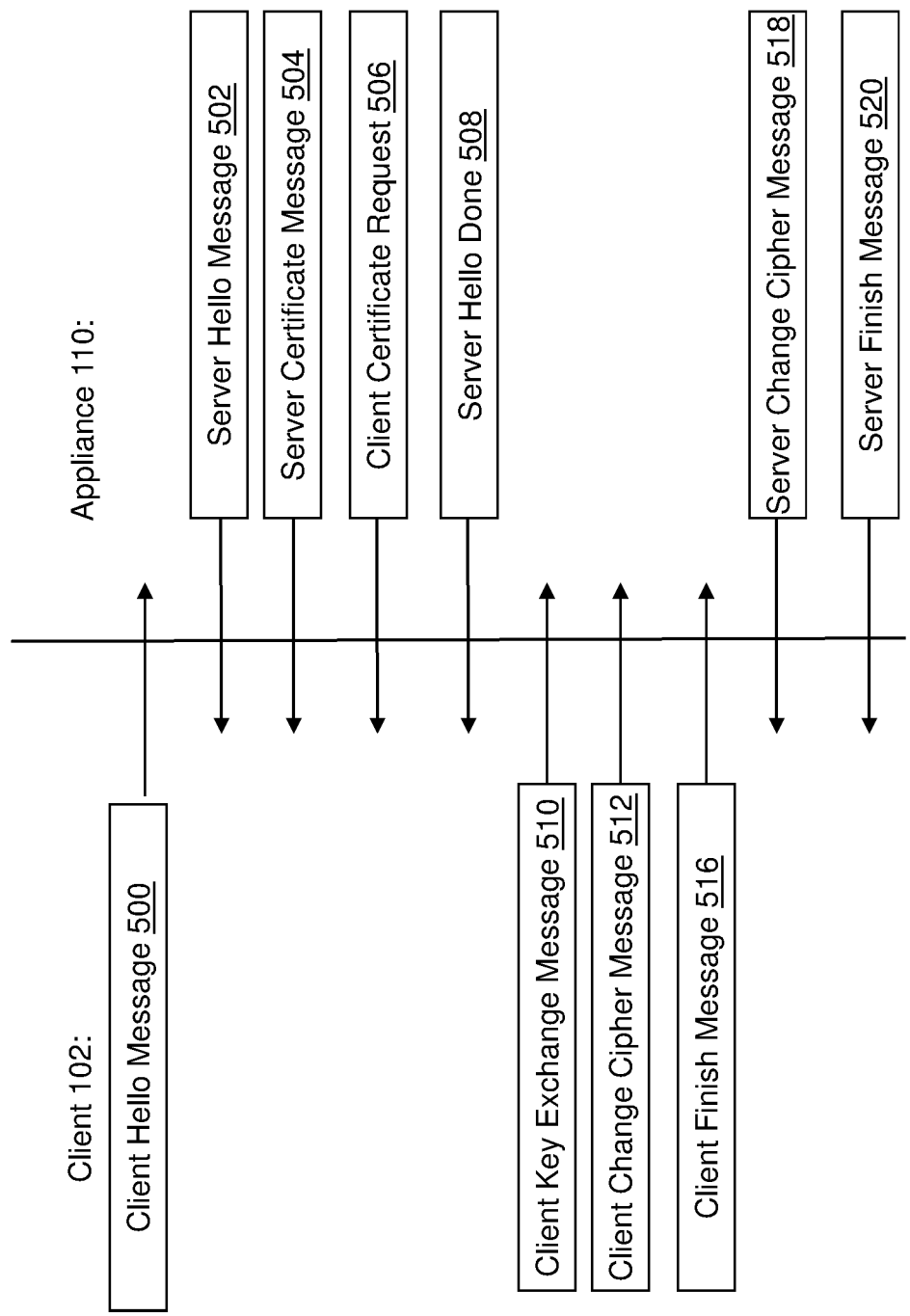
FIG. 4 is a data flow diagram of an example SSL handshake.

Referring now to FIG. 4, a data flow diagram of an example SSL handshake is shown. In brief overview, a client 102 transmits a client hello message 500. An appliance 110 may then respond with a server hello 502, a server certificate 504, a client certificate request 506, and a server hello done messages 508. The client may then respond with a client key exchange message 510, a client change cipher message 512, and a client finish message 516. Appliance 110 may then respond to client 102 with a server change cipher message 518, and a server finish message 520. In some SSL handshakes, in response to the server's certificate request message 506, client 102 may send a client certificate message (not shown) followed by a client key exchange message 510, a client-certificate-verify message (not shown), a client-change-cipher message 512 and a client finish message 516.

Still referring to FIG. 4, now in greater detail, a client 102 and an appliance 110 engage in an SSL handshake. An SSL handshake may be performed according to any version of SSL including without limitation SSLv2 and SSLv3.0. An SSL handshake may also be performed according to any related secure communication standards including without limitation TLS 1.0 as defined in RFC 2246 and TLS 1.1 as defined in RFC 4346. Additional published documents describing related protocols and extensions to SSL and TLS which may be used in conjunction with the methods described below include without limitation RFC 2712, RFC 2817, RFC 2818, RFC 3268, RFC 3546, RFC 7132, RFC 7162, RFC 4279, RFC 4347, RFC 4366, and RFC 4492.

In one embodiment, an appliance may perform an SSL handshake as a client. For example, an appliance may initiate an SSL connection with a service 106, with a second appliance. In this embodiment, the appliance may send the client hello message 500, a client certificate message (not shown), a client key exchange message 510, a client change cipher message 512, and/or a client finish message 516. In this embodiment, the appliance may also send a client certificate message (not shown) followed by a client key exchange message 510, a client-certificate-verify message (not shown), a client-change-cipher message 512 and a client finish message 516. In another embodiment, an appliance may perform an SSL handshake as a service 106, e.g., to another service 130 (FIG. 5).

In another embodiment, an abbreviated SSL handshake may be used to resume a previous session. In another embodiment, an SSL handshake may also include server verification of a client, such as via transmission from the client to the server of a client certificate and a client certificate verify message.

An SSL handshake may require a message digest be computed of all the messages exchanged in order to verify that an SSL server and SSL client have received the same messages, and no errors or attacks have been introduced into the transmissions. To perform the verification, a client may first compute a message digest of all the messages the SSL client has sent and received comprising the handshake, and then transmit the result to the SSL server via a client finish message 516. The SSL server may then compute the message digest of all messages the SSL server has sent and received in order to verify that the two message digests are the same. The SSL client and SSL server may compute the message digest usage digest algorithm agreed upon during the course of the handshake. Examples of message digest algorithms may include without limitation MD4; MD5; CRC-32; MD5; RIPEMD-1360; SHA; and HAVAL.

E. Systems and Methods for Pre-Authorizing a Service-to-Service Request

As network environments have increased in complexity, the compartmentalization of functions has increased, resulting in a larger number of services and increased interdependencies between services. To illustrate, FIG. 5 shows a network environment 100 similar to that shown in FIG. 1A but further including one or more target services 130(1)-130(n) (also generally referred to as remote target service machine(s) 130 or target service server(s) 130) accessed via one or more networks 104(1)-104n (generally referred to as network(s) 104). Services 106 may place a service request to one or more target services 130 to have specific and/or ancillary functions performed to the tasks performed by services 106. In this setting, a service 106 shall be referred to as a "request service 106" as it is the component placing the service request (also generally referred to as a service call or task call). In one example, described relative to FIG. 1B, request service 106 may include an application delivery system 120 for delivering a computing environment, application, and/or data files to one or more clients 102. In this case, as shown in FIG. 5, request service 106 may request functions be performed by additional services 130, referred to herein as "target services." Target services 130 may include practically any now known or later developed functionality desired such as but not limited to specific functions that support delivering a computing environment, application, and/or data files to one or more clients 102 by request services 106. Examples of functions that may performed by a target service 130 may include but are not limited to: authorizing customer access, performing monitoring agent 142 (FIG. 1B) functions, application delivery system 120 (FIG. 1B) functions, subscribing users to applications in a workspace, creating resource locations, configuring domains from which users can be selected, looking up order status, synchronizing user information, retrying failed customer on-boardings, sending notifications, etc.

The increased complexity of network environments has an impact on the performance of such environments. For example, a task initiation may create a cascade of service requests by request service 106 to target services 130 where the connection cannot be maintained open by an appliance 110. Each of the requests may have similar overhead as the SSL handshake described relative to FIG. 4. For example, request service 106 must generate an authorization header using a signature of target service 130, e.g., full target URL encoded with the source service name. Target service 130 then needs to validate the signature by decoding the authorization header, obtaining the public key of request service 106, e.g., by further communications with another public key system (not shown), and then validate the signature against the current service request URL. Thus, target service 130 proceeds through a similar authorization as shown in FIG. 4. This process is repeated each time for any inter-service request, adding to the overall latency and performance degradation of network environment 100.

As described herein, appliance 110 may relieve request services 106 of much of the processing load caused by repeatedly opening and closing transport layers connections to target services 130 by opening one or more transport layer connections with each service 106 and maintaining these connections to allow repeated data accesses by services via the Internet (e.g., "connection pooling"). However, as network environments 100 increase in complexity, the larger number of target services 130 and increased inter-dependencies between services 106, 130, prevents appliances 110 from adequately addressing the additional computational overhead. Where a particular target service 130 is used frequently, the performance and latency impacts can be significant.

As indicated above, embodiments of the disclosure provide systems and methods for pre-authorizing a service request between two services, i.e., service-to-service, in a network environment 100 that is more efficient and scalable. It has been discovered that request services 106 make service requests of certain target services 130 repeatedly over time, e.g., because each service typically has a well-defined functionality that may be frequently required. Embodiments of the disclosure conduct a pre-authorization prior to a service request being made, e.g., for services that are accessed with high frequency. The pre-authorization can occur as a background operation prior to a service request and separate from a service request. As described herein, the pre-authorizations can be stored in such a manner that they are ready for use when a service request is made, allowing quicker and less cumbersome security validation and authorization between services. For example, as shown in FIG. 5, data related to pre-authorizations can be stored for target service 130 locally or, where more than one instance exists, in a distributed storage device 640 accessible by instances of target service 130. Similarly, as shown in FIG. 5, data related to pre-authorizations can be stored for request service 106 locally or, where more than one instance exists, in a distributed storage device 642 accessible by instances of request service 106. Distributed storage devices 640, 642 may include any of a variety of secure distributed storage systems such as but not limited to: Microsoft® Azure® service fabric stateful services such as Cosmos DB, or an open source system such as Redis. To prevent accidental or improper access, the pre-authorizations can have a short set duration. The pre-authorization process occurs as a background process separate from any service request, thus reducing overhead and latency. That is, in general, the pre-authorization process executes transparently (e.g., in the background) to any application and/or user of services 106 and/or 130. Application of embodiments of the disclosure may be applicable between any two computing devices 150 (FIG. 1C), but find advantage as applied to two services 106, 130 that exhibit a high volume of service requests therebetween compared to other services, and may have a specific way of communicating with one another. One example includes certain services that are part of a cloud platform control plane. Identification of target services 130 to which a pre-authorization process according to embodiments of the disclosure should be applied can be made using data from performance monitoring agent(s) 142 (FIG. 1B). For example, target services 130 that have more than certain number of service requests placed by a request service 106 within a certain period of time, may be candidates for the pre-authorization process, described herein. Identification of target services 130 to which the pre-authorization process may be applied can be user defined.

With further reference to FIG. 5, one or more networks 104 may be located between request service 106 and target service 130. In other embodiments, both services 106, 130 may be on the same network 104. The various networks 104 may be the same type of network or different types of networks. Each network 104 may be of any type described herein relative to FIG. 1A. One or more appliances 110 may be located at various points or in various communication paths of network environment 100, and may take any form described herein relative to FIG. 1A.

As shown in FIG. 5, one or more request services 106 may also operate as a server farm 112, as described herein. Similarly, each target service 130 may operate as a server farm 612. Target services 130 may be logically grouped, and may either be geographically co-located (e.g., on premises) or geographically dispersed (e.g., cloud based) from clients 102 (FIG. 1A) and/or other services 106. Each target service 130 may include any number of instances thereof, i.e., servers belonging to the same particular class that share the same set of attributes and/or functions. Similarly, each request service 106 may include any number of instances thereof. In an embodiment, target services 130 execute one or more functions such as applications on behalf of one or more of request services 106 (and/or clients 102 via request services 106)(e.g., as an application server), although other uses are possible, such as a file server, gateway server, proxy server, or other similar server uses.

FIG. 5 also shows a topic 602 capable of communicating with services 106, 130 via network 104 and/or appliance(s) 110. Topic 602 may include a program that broadcasts an event to all the subscribers of its distribution list. Topic 602 executes transparently (e.g., in the background) to any application and/or user of network environment 100. Each instance of request service 106 and each instance of target service 130 subscribe to events 604 published to topic 602 such that events 604 published (posted) to topic 602 from any instance of a service 106 or 130 are communicated to instances of the transmitting service and instances of the other service 106 or 130. Topic 602 may be located at various points or in various communication paths of network environment 100. For example, topic 602 may be implemented within a storage device 606 communicating with network 104, as shown. In other embodiments, topic 602 may be deployed between two networks 104(1) and 104(2), e.g., as part of system daemon services 258 (FIG. 2) of an appliance 110. As noted, system daemon services 258 (FIG. 2) are programs that run continuously or in the background and handle periodic service requests. In some embodiments, system daemon service 258 (FIG. 2) may forward the requests to other programs or processes, such as another daemon service, as appropriate. In other embodiments, topic 602 may be located on a network 104. For example, topic 602 may be implemented as part of request services 106 and/or target services 130. In one example, topic 602 may be part of daemon service (not separately shown) of service 106 or 130. In any event, topic 602 may receive events 604 from any instance of service 106 or 130 and communicate the event to instances of the other service 106 or 130.

Figure 6:
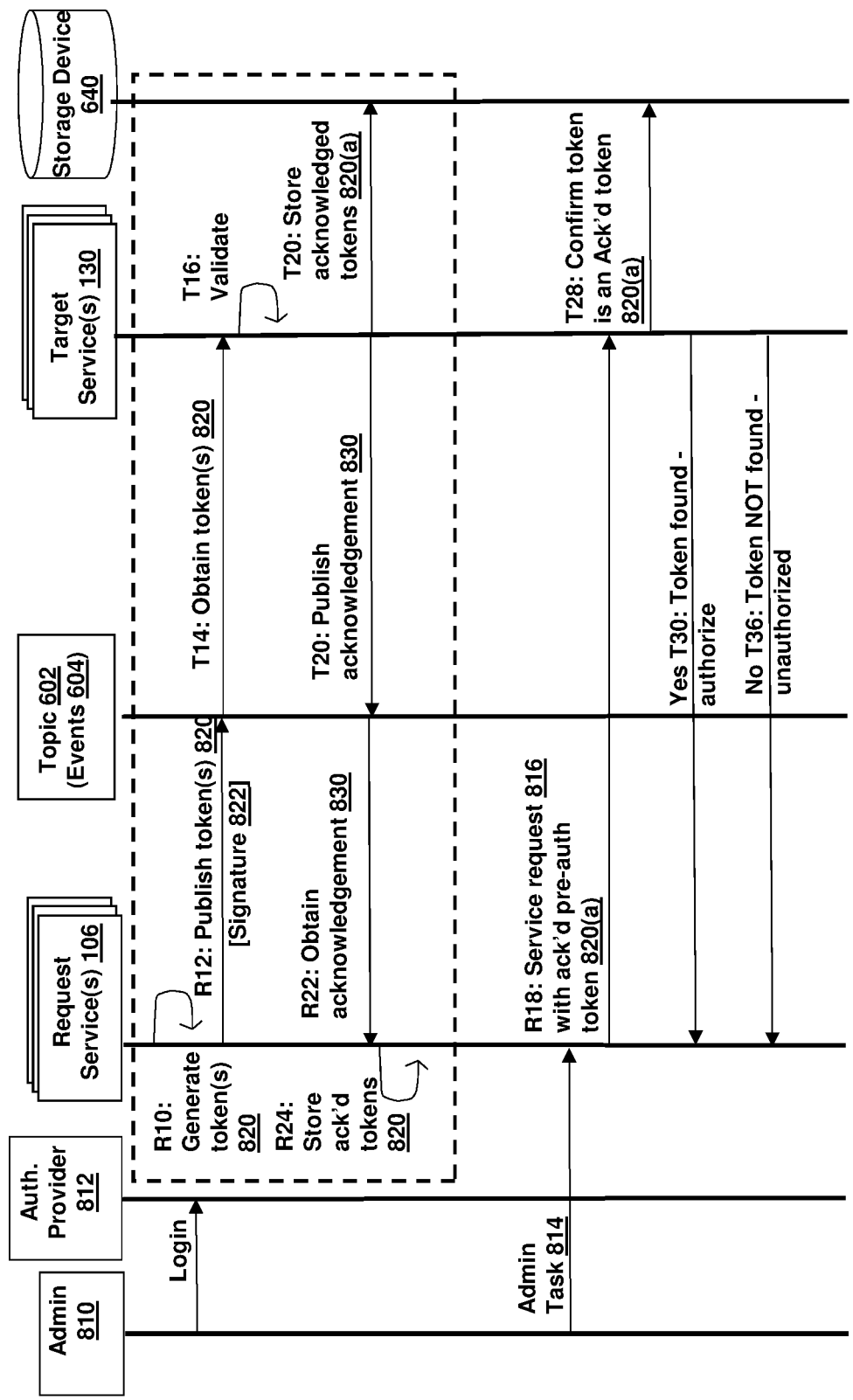
FIG. 6 is a data flow diagram of a method in accordance with an illustrative embodiment.
Figure 7:
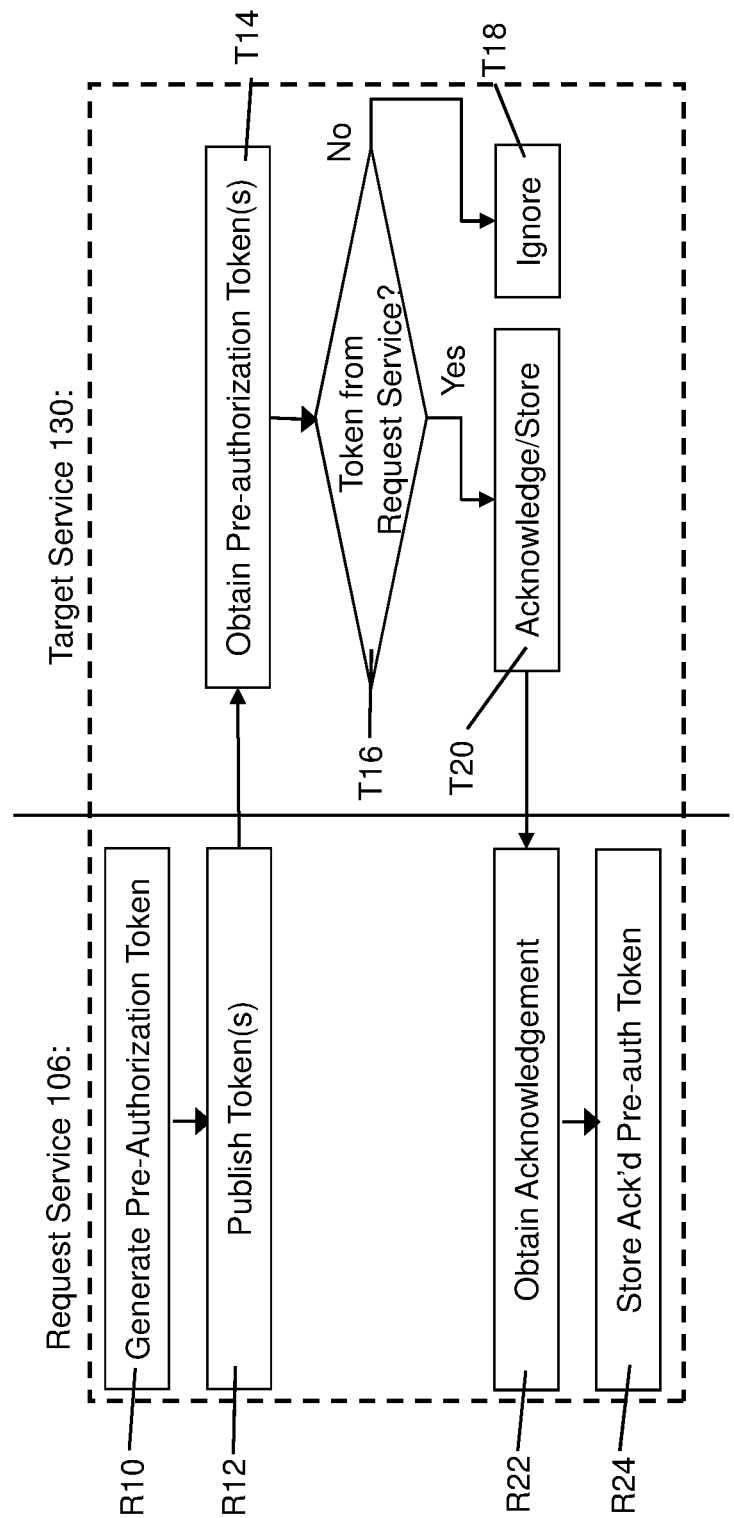
FIG. 7 is a swim lane diagram of a recurring background pre-authorization process in accordance with an illustrative embodiment.
Figure 8:
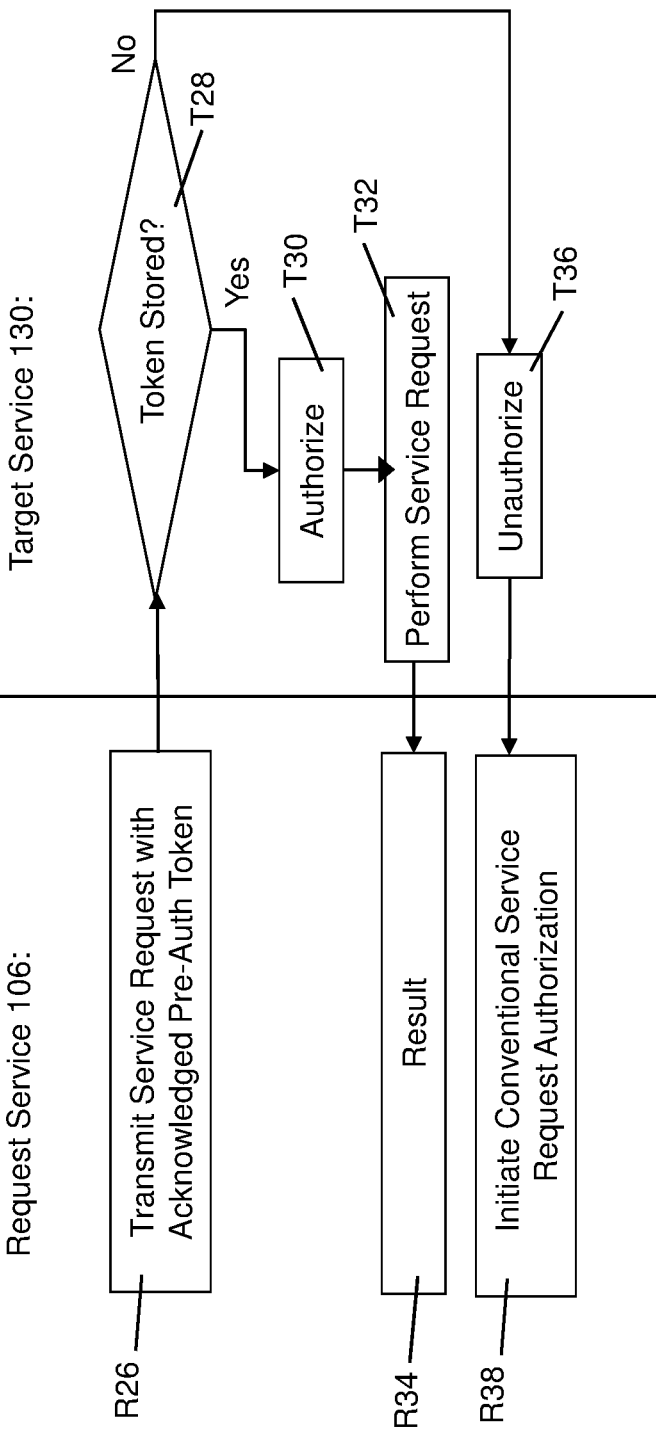
FIG. 8 is a swim lane diagram of a service request using an acknowledged pre-authorization token in accordance with an illustrative embodiment.

Methods according to embodiments of the disclosure will now be described relative to FIGS. 5-8. FIG. 6 is a data flow diagram illustrating data flows of methods for authorizing a service request between two services 106, 130 in network environment 100 (FIGS. 1A and 5). FIG. 7 shows a swim lane diagram of methods of a recurring background pre-authorization process between two services 106, 130 in network environment 100 (FIGS. 1A and 5) from the perspective of both request service 106 and target service 130. FIG. 8 shows a swim lane diagram of a request service 106 placing a service request 816 using an acknowledged pre-authorization token 820(*a*).

In FIGS. 7 and 8, processes carried out by request service 106 are noted with an alphanumeric reference with an 'R' alphabetic indicator, e.g., process R10, and processes carried out by target service 130 are noted with an alphanumeric reference with a 'T' alphabetic indicator, e.g. process T14. Processes shown in FIGS. 7 and 8 are also noted in FIG. 6, where necessary. The dashed box in FIGS. 6 and 7 show processes according to the disclosure that represent a recurring background pre-authorization process occurring separate from service request 816 between request service 106 and target service 130. That is, in general, the pre-authorization process executes transparently (e.g., in the background) to any application and/or user of services 106, 130. Each service 106, 130 performs a respective portion of the recurring background processes that collectively provide the overall methodology according to embodiments of the disclosure.

In the description that follows, it is understood that each service 106, 130 may include a number of instances, denoted with the layered boxes thereof in FIG. 6. Unless explained as being expressly applied to multiple instances, it is understood that the processing described may be performed by one or more instances of each service 106, 130.

As shown in FIG. 6, an administrator 810 may login into an authorization provider 812, and place an administrative task 814 to a request service 106. Administrative task 814 can include any now known or later developed request for a computer function to be performed. Administrative task 814 may cause request service 106 to provide part of the computational function requested directly, but may also cause request service 106 to place one or more service requests 816 to one or more target services 130. As noted, each target server 130 performs at least one function that is more readily provided by a separate server from request service 106, e.g., for load distribution, function specialization, etc.

In process R10 (FIGS. 6 and 7), request service 106 may generate a pre-authorization token(s) 820. Each pre-authorization token 820 may include a signature 822 of request service 106. Signature 822 includes an identification of request service 106 identifying the request service 106, and a cryptographic value from which an instance of target service 130 may validate token 820 as being from request service 106. The cryptographic value may be a value based on any known or later developed cryptography protocol that does not require computational overhead of an asymmetric system, e.g., symmetrical key cryptography like Advanced Encryption Standard (AES). In one example, when a pre-authorization token 820 is generated, request service 106 may generate a signed cryptographic value, encode the cryptographic value and the signature (e.g., generating a delimited string and Base64 encoding it). As described herein, target service 130 and decode pre-authorization token 820, and validate the signature of the included cryptographic value. The signature may be a standard RSA (Rivest-Shamir-Adleman) signing. RSA is a common public key cryptosystem used for secure data transmissions. It is noted that many different target services 130, perhaps with each providing different functions, may receive service requests 816 from request service 106. To address this situation, pre-authorization token 820 is configured for validation by a predetermined one of the plurality of target services 130, i.e., any instance of a predetermined one of target services 130. That is, the cryptographic value is configured for validation by a specific target service 130.

In process R12 (FIGS. 6 and 7), request service 106 publishes pre-authorization token 820 for access by any instance of target service 130. Publishing token(s) 820 may include posting the token(s) to topic 602 (FIGS. 5 and 6) as an event 604. As described, topic 602 broadcasts event 604 to all subscribers of its distribution list, including each instance of target server 130. As noted, topic 602 executes transparently (e.g., in the background) to any application and/or user of network environment 100. Contemporaneously, in process T14 at target service 130, each instance of target service 130 obtains pre-authorization token(s) 820, e.g., receives it as a message from topic 602 or accesses topic 602 to retrieve it.

In process T16 (FIGS. 6 and 7), target service 130 validates pre-authorization token 820. That is, target service 130 confirms whether pre-authorization token 820 was issued by request service 106 specified in signature 822. Target service 130 may make the confirmation, for example, by using the appropriate decryption process for the cryptographic value of signature 822. In process T16, in response to not confirming the pre-authorization token was issued by the first service specified in the signature, i.e., No at process T16, target service 130 ignores pre-authorization token 820 at process T18. Alternatively, in response to confirming the pre-authorization token was issued by request service 106 specified in the signature, i.e., Yes at process T16, target service 130 acknowledges pre-authorization token 820 at process T20. Process T20 may also include target service 130 storing acknowledged pre-authorization token 820(*a*) for access by any instance of target service 130. Target service 130 may store acknowledged token 820(*a*) at a storage device 640 accessible by all instances of target service 130, e.g., a distributed storage device 640. To prevent unauthorized use of acknowledged tokens 820(*a*), each token may have a set duration, i.e., a time during which it is viable, and after which it expires and is no longer usable. The set duration may be implemented in any now known or later developed fashion. In one embodiment, a configurable time-to-live (TTL) may be employed, e.g., a counter or timestamp attached to or embedded in the data that directs discarding of the data once the predefined timespan has elapsed. The set duration can be user defined, e.g., 30 minutes, 1 hour, etc.

With further regard to the acknowledging at process T20, the process may include target service 130 publishing acknowledgement 830 as an event 604 to topic 602. As noted, each of request service 106 and target service 130 subscribe to events 604 published to topic 602 such that request service 106 may contemporaneously obtain acknowledgment 830 acknowledging validation of pre-authorization token 820(*a*) as being issued by request service 106. That is, in process R22, each instance of request service 106 obtains acknowledgement 830, e.g., receives it as a message from topic 602 or accesses topic 602 to retrieve it. Acknowledgement 830 may take a variety of forms. In one embodiment, acknowledgement 830 may include data that identifies its corresponding pre-authorization token 820 such that request service 106 can identify the pre-authorization token 820 that acknowledgement 830 corresponds to. In another embodiment, acknowledgement 830 may include a revised pre-authorization token (not separately labeled) that includes the same data as acknowledged pre-authorization token 820(*a*) and includes an identity of target service 800 and a new cryptographic value and signature of target service 800. In this setting, request service 106 can validate the revised acknowledged pre-authorization token when it receives it (including decoding it to reveal the data).

In process R24, request service 106 stores pre-authorization token 820(*a*) for access by request service 106. In one embodiment, where acknowledgement 830 identifies its corresponding acknowledged pre-authorization token 820, request service 106 can identify the pre-authorization token 820, and save the appropriate acknowledged pre-authorization token 820(*a*). In another embodiment, where acknowledgement 830 includes acknowledged pre-authorization token 820, request service 106 can simply save the acknowledged pre-authorization token 820(*a*). In any event, request service 106 stores each pre-authorization token 820(*a*) that has been acknowledged by target service 130. Each instance of request service 106 may store acknowledgement pre-authorization token 820(*a*), e.g., locally or in a distributed storage device 642 (FIG. 5). Distributed storage device 642 (FIG. 5) is accessible by all instances of request service 106.

As noted herein, the processes in the dashed box in FIGS. 6 and 7 represent a recurring background pre-authorization process, according to embodiments of the disclosure. In this regard, as the set duration expires, causing the expiration of acknowledged pre-authorization tokens 820(*a*), the processes R10-R24 may repeat. For example, request service 106 may generate another pre-authorization token 820 at process R10 after expiration of the set duration, and publish pre-authorization token 820, at process R12, as an event 604 to topic 602. Processes T14, T16, T18, T20, R22 and R24 may follow to provide additional authorized pre-authorization token(s) 820(*a*) available for use. The number of pre-authorization tokens 820(*a*) available at any given time can be user defined, e.g., based on the expected amount of service request traffic between services 106, 130. For example, a particular request service 106 may be configured to keep a minimum number of pre-authorization tokens 820 for a particular target service 130 depending on how much service request traffic goes between the two services.

Methods and systems using the recurring background process described herein can pre-authorize service requests without the existing back-and-forth between services 106, 130 and without burdening target service 130 (and appliances 110) with the computational overhead and latency of existing authentication protocols.

Continuing with FIG. 6 and with additional reference to FIG. 8, use of pre-authorization token(s) 820(*a*) will now be described. In process R26, request service 106 transmits a service request 816 including acknowledged pre-authorization token 820(*a*) to target service 130. Process R26 may performed in any known or later developed manner, except the customary authorization header is replaced with acknowledged pre-authorization token 820(*a*). In process T28, in response to receiving service request 816 including pre-authorization token 820(*a*) at an instance of target service 130, target service 130 confirms whether pre-authorization token 820(*a*) matches a stored, acknowledged pre-authorization token 820(*a*), e.g., stored in a distributed storage device 640. This process may include a simple lookup, which reduces computational overhead compared to other processes such as those that require public key attainment, and other cryptographic analysis. In response to a confirmation, i.e., Yes at process T28, target service 130 authorizes service request 816 at process T30. Subsequently, target service 130 may perform the desired service request 816 at process T32, and return a result to request service 106 at process R34.

Alternatively, in response to receiving service request 816 including pre-authorization token 820 at the instance of target service 130 and not confirming the pre-authorization token matches a stored, acknowledged pre-authorization token 820(*a*), i.e., No at process T28, target service 130 indicates the service request is unauthorized at process T36. Non-confirmation can occur for a number of reasons. For example, the acknowledged pre-authorization token 820(*a*) sent from request service 106 may have expired, i.e., it was not received before expiration of its storage in storage device 640, or the pre-authorization token 820 sent from request service 106 was not previously validated/acknowledged at process T16, T20 (FIG. 7). Where service request 816 is not authorized by way of the pre-authorization process, at process R38, request service 106 may initiate a conventional service request authorization, e.g., using an asymmetric cryptographic process such as private-public key protocol, and accepting the necessary computational overhead at services 106, 130 and/or appliance(s) 110.

Embodiments of the disclosure provide methods and systems for pre-authorization of a service request between two services with a number of advantages relative to conventional processes. For example, teachings of the disclosure do not require changes in infrastructure, such as maintaining client certificates for service instances, and do not remove any existing authentication mechanisms for platform services. However, embodiments of the disclosure can drastically improve overall performance for customer facing tasks by reducing computational overhead and latency caused by existing authentication mechanisms.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for authorizing a service request between two services in a network environment, the method comprising:
   in a recurring background process occurring between a first service and a second service:
      obtaining, at the second service, a pre-authorization token from the first service, the pre-authorization token including a signature of the first service,
      confirming, at the second service, that the pre-authorization token was issued by the first service specified in the signature,
      in response to the second service confirming that the pre-authorization token was issued by the first service specified in the signature, generating, at the second service, an acknowledgement of the pre-authorization token, and
      storing, by the second service, the acknowledged pre-authorization token for access by any instance of the second service;
   and, separate from the recurring background process:
      in response to receiving the service request from the first service including the pre-authorization token at an instance of the second service, confirming, at the instance of the second service, the pre-authorization token matches the stored, acknowledged pre-authorization token, and, in response to the confirmation, authorizing, by the instance of the second service, the service request from the first service,
   wherein the recurring background process further comprises generating the pre-authorization token at the first service and publishing, by the first service, the pre-authorization token as an event to a topic, wherein the first service and the second service subscribe to events published to the topic.

2. The method of claim 1, further comprising in response to receiving the service request from the first service including the pre-authorization token at the instance of the second service and not confirming the pre-authorization token matches the stored, acknowledged pre-authorization token, indicating, by the instance of the second service, the service request is unauthorized.

3. The method of claim 1, wherein the second service includes a plurality of instances of the second service, and wherein the pre-authorization token is configured for validation by a predetermined one of the plurality of the instances of the second service.

4. The method of claim 3, wherein each instance of the second service subscribes to events published to the topic.

5. The method of claim 4, wherein storing the acknowledged pre-authorization token for access by any instance of the second service includes storing the acknowledged pre-authorization token for a set duration.

6. The method of claim 5, wherein the recurring background process: generates, by the first service, another pre-authorization token after expiration of the set duration, and publishes, by the first service, the another pre-authorization token as an event to the topic.

7. The method of claim 1, further comprising publishing, by the second service, the acknowledgement as an event to the topic.

8. A system for authorizing a service request between two services in a network environment, the system comprising:
   a target service configured to run a recurring background process occurring between a request service and the target service, the recurring background process including:
      obtaining, at the target service, a pre-authorization token from the request service, the pre-authorization token including a signature of the request service,
      confirming, at the target service, that the pre-authorization token was issued by the request service specified in the signature,
      in response to the target service confirming that the pre-authorization token was issued by the request service specified in the signature, generating, at the target service, an acknowledgement of the pre-authorization token, and
      storing, in a storage device, by the target service, the acknowledged pre-authorization token for access by any instance of the target service;
   and, separate from the recurring background process,
      in response to receiving the service request from the request service including the pre-authorization token at an instance of the target service, confirming, at the instance of the target service, the pre-authorization token matches the stored, acknowledged pre-authorization token, and, in response to the confirmation, authorizing, by the instance of the target service, the service request from the request service, wherein the recurring background process further comprises generating the pre-authorization token at the request service and publishing, by the request service, the pre-authorization token as an event to a topic, wherein the request service and the target service subscribe to events published to the topic.

9. The system of claim 8, further comprising in response to receiving the service request including the pre-authorization token at the instance of the target service and not confirming the pre-authorization token matches the stored, acknowledged pre-authorization token, indicating, by the instance of the target service, the service request is unauthorized.

10. The system of claim 8, wherein the target service includes a plurality of instances of the target service, and wherein the pre-authorization token is configured for validation by a predetermined one of the plurality of instances of the target service.

11. The system of claim 10, wherein each instance of the target service subscribes to events published to the topic.

12. The system of claim 8, further comprising publishing, by the target service, the acknowledgement as an event to the topic.

13. The system of claim 8, wherein the storage device is configured to store each acknowledged pre-authorization token for access by any instance of the target service for a set duration.

14. The system of claim 8, wherein the storage device is configured to publish the acknowledgement and the pre-authorization token as an event posted thereto, wherein each of the request service and the target service subscribe to events published to the storage device.

15. A method for authorizing a service request between two services in a network environment, the method comprising:
  in a recurring background process occurring between a first service and a second service:
    generating, at a first service, a pre-authorization token including a signature of the first service,
    publishing, by the first service, the pre-authorization token,
    validating, at the second service, that the pre-authorization token was issued by the first service specified in the signature, and in response to validating the pre-authorization token, generating, at the second service, an acknowledgment acknowledging validation of the pre-authorization token as being issued by the first service specified in the signature in the pre-authorization token, and
    storing, by the second service, the acknowledged pre-authorization token for access by the first service;
  and, separate from the recurring background process:
    transmitting, by the first service, the service request including the acknowledged pre-authorization token to the second service; and
    receiving, at the first service, an authorization, from the second service, for the service request,
    wherein the recurring background process further comprises generating the pre-authorization token at the first service and publishing, by the first service, the pre-authorization token as an event to a topic, wherein the first service and the second service subscribe to events published to the topic.

16. The method of claim 15, wherein the second service includes a plurality of instances of the second service, wherein the pre-authorization token is configured for validation by a predetermined one of the plurality of instances of the second service, and wherein the first service publishes the pre-authorization token to the plurality of instances of the second service.

17. The method of claim 15, wherein the signature includes a signed cryptographic value.

18. The method of claim 15, wherein the second service includes a plurality of instances of the second service, and wherein each instance of the second service subscribes to events published to the topic.

19. The method of claim 15, wherein storing the acknowledged pre-authorization token includes storing the acknowledged pre-authorization token for a set duration.

20. The method of claim 19, wherein during the recurring background process, the first service generates another pre-authorization token after expiration of the set duration, and the first service publishes the another pre-authorization token as an event to the topic.

21. A system for authorizing a service request between two services in a network environment, the system comprising:
  wherein the request service is configured to perform a recurring background process with a target service, the recurring background process including:
    generating, at the request service, a pre-authorization token including a signature of the request service,
    publishing, by the request service, the pre-authorization token,
    validating, at the target service, that the pre-authorization token was issued by the request service specified in the signature, and in response to validating the pre-authorization token, generating, at the target service an acknowledgment acknowledging validation of the pre-authorization token as being issued by the request service specified in the signature in the pre-authorization token, and
    storing, in a storage device, the acknowledged pre-authorization token for access by the request service;
  and, separate from the recurring background process:
    transmitting, by the request service, the service request including the acknowledged pre-authorization token to the target service; and
    receiving, at the request service an authorization from the target service for the service request,
    wherein the recurring background process further comprises publishing, to the storage device, the acknowledgement and the pre-authorization token as an event, wherein the request service and the target service subscribe to events published to the storage device.

22. The system of claim 21, wherein the target service includes a plurality of instances of the target service, and wherein the pre-authorization token is configured for validation by a predetermined one of the plurality of instances of the target service.

23. The system of claim 22, wherein each instance of the target service subscribes to events published to the storage device.

24. The system of claim 21, wherein the pre-authorization token is valid for a set duration, and wherein the request service is further configured to generate another pre-authorization token after an expiration of the set duration, and publish the another pre-authorization token as an event to the storage device.

* * * * *